United States Patent [19]

Winters

[11] 4,148,616
[45] Apr. 10, 1979

[54] SCRUBBER FOR CONTAMINATED GAS

[75] Inventor: Heinrich Winters, Düsseldorf, Fed. Rep. of Germany

[73] Assignee: Büttner-Schilde-Haas AG, Krefeld, Fed. Rep. of Germany

[21] Appl. No.: 758,302

[22] Filed: Jan. 10, 1977

Related U.S. Application Data

[62] Division of Ser. No. 564,837, Apr. 3, 1975.

[30] Foreign Application Priority Data

Apr. 8, 1974 [DE] Fed. Rep. of Germany ....... 2416958

[51] Int. Cl.² .................................... B01D 47/00
[52] U.S. Cl. ................... 55/226; 55/257 R; 55/393; 55/415; 261/79 A; 261/30; 261/DIG. 54; 261/118; 261/116
[58] Field of Search ............... 55/393, 226, 415, 230, 55/235-238, 257 R; 261/79 A, 88-90, 116, 118, 30, DIG. 54

[56] References Cited

U.S. PATENT DOCUMENTS

| 2,590,342 | 3/1952 | Nierhaus et al. | 55/406 |
| 3,326,538 | 6/1967 | Merritt | 55/230 |
| 3,834,127 | 9/1974 | Jordan et al. | 55/226 |

FOREIGN PATENT DOCUMENTS 172640  9/1952  Austria ........................ 55/230

Primary Examiner—Bernard Nozick
Attorney, Agent, or Firm—Michael J. Striker

[57] ABSTRACT

The scrubber has a substantially rotationally symmetrical vortex chamber provided at one end with an axial gas outlet whose diameter is substantially smaller than the diameter of the chamber. A coaxial impeller wheel is located at the other axial end of the chamber and admits into the region of the chamber periphery a stream of contaminated gas which has a component of movement in circumferential direction of the chamber. A plurality of spray nozzles spray a washing liquid into the chamber for contact with the contaminated gas therein.

14 Claims, 5 Drawing Figures

SCRUBBER FOR CONTAMINATED GAS

This is a division, of application Ser. No. 564,837, filed Apr. 3, 1975.

BACKGROUND OF THE INVENTION

The present invention relates to a scrubber for contaminated gas.

It is known in the prior art to provide scrubbers for removing particles or gaseous contaminants from a gas stream. The prior-art device has a construction wherein the contaminated gases are admitted at high speed through a tangential gas inlet into a vortex chamber. The admission is the result of suction created in the vortex chamber, and the admitted gases are accelerated in the vortex chamber in direction towards an axial gas outlet thereof, to a speed which is a multiple of their inlet speed. A washing liquid is centrally sprayed into the chamber through the gas outlet.

This prior-art device is basically satisfactory in its intended purposes. However, to produce the gas flow which enters the vortex chamber this device requires a ventilator which is a separate structural unit and is connected with the gas outlet opening of the vortex chamber by a conduit. Such a construction is both relatively complicated and expensive, and also cannot be made as compact as is desired for many applications. Furthermore, the effectiveness of the operation of this prior-art device is not as good as is desired.

SUMMARY OF THE INVENTION

Accordingly, it is an object of this invention to overcome the disadvantages of the prior art.

More particularly it is an object of the invention to provide an improved scrubber for contaminated gas which avoids the aforementioned disadvantages and provides an improved degree of efficiency.

A further object of the invention is to provide such an improved scrubber which is particularly compact in construction and relatively simple, so that it is also comparatively inexpensive.

In keeping with these objects, and with others which will become apparent hereafter, one feature of the invention resides in a scrubber for contaminated gas which, briefly stated, comprises first means forming an at least substantially rotationally symmetrical vortex chamber having a periphery and two axial ends. Second means defines at one of these axial ends an axial gas outlet having a diameter which is substantially smaller than the diameter of the chamber. Third means is provided, including a coaxial impeller wheel at the other axial end of the chamber, for admitting in the region of the chamber periphery a stream of contaminated gas having a component of movement in circumferential direction of the chamber. Fourth means is provided for admitting a washing liquid into the chamber for contact with the contaminated gas therein.

The scrubber of the invention may be provided with a contaminant separating zone constituting an integral part of the scrubber device, so that unlike the prior art, where such removal zones are provided in separate units, all connecting conduits and the like are eliminated. This means that the gas to be cleaned of contaminants travels in a single uninterrupted rotational or twisted flow through the entire device of the invention, without at any time having to reverse its direction of rotation or its direction of movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
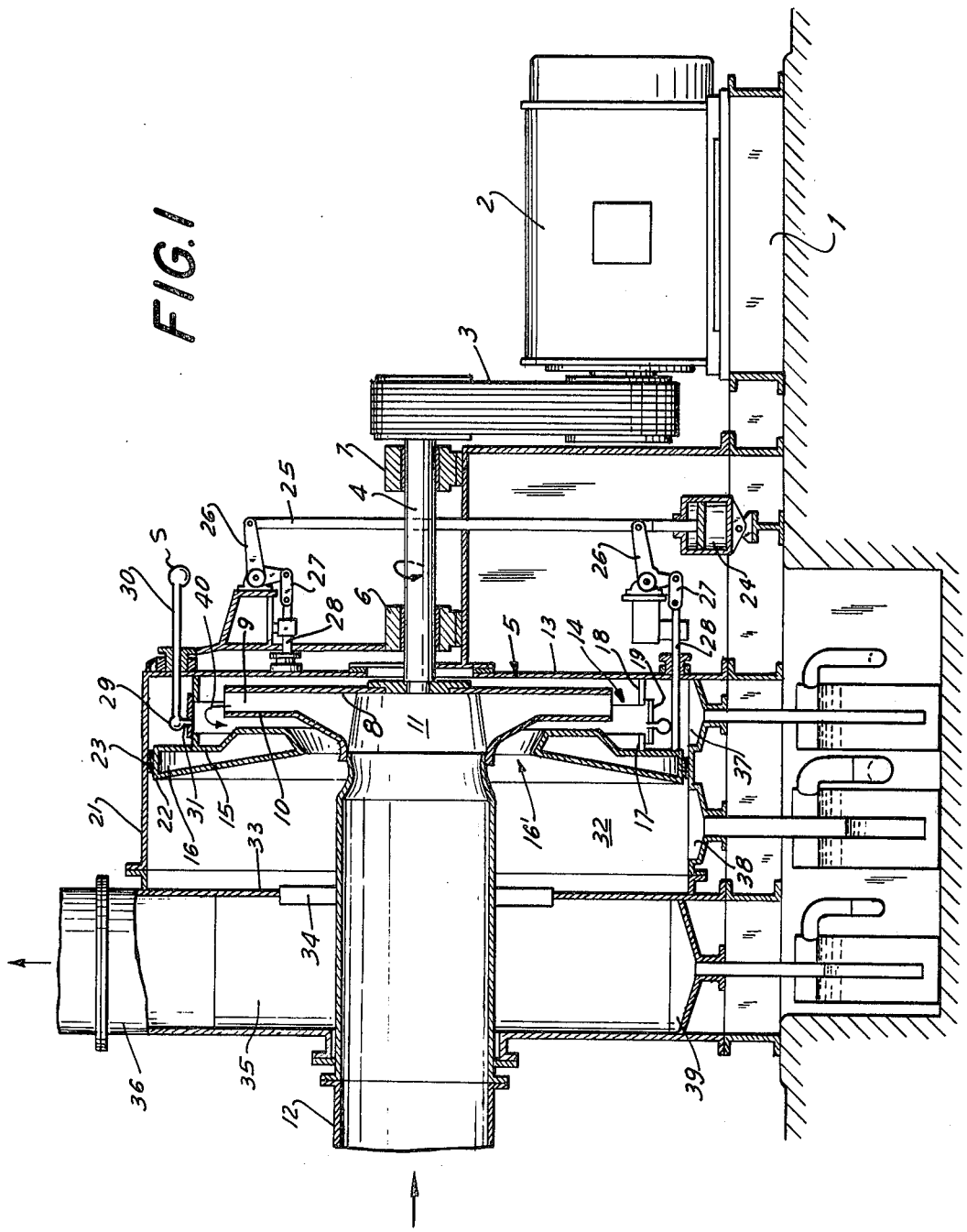
FIG. 1 is a fragmentary side elevational view illustrating one embodiment of the invention.

Referring now in detail to the drawing, and discussing firstly the embodiment illustrated in FIG. 1, it will be seen that reference numeral 1 identifies a frame or base on which an electric motor 2 is mounted. The motor 2 drives via a transmission—here illustrated as a drive belt 3—the shaft of an impeller wheel 5 which in this embodiment is of the radial-flow type. The shaft 4 is journalled for rotation in bearings 6 and 7. The impeller wheel 5 is composed essentially of two end plates, namely a planar closed end plate S, and an annular end plate 10 which has a radially outermost planar annular portion and a radially inner conical or trumpet-shaped portion. Located in the space between the end plates 8 and 10 is a plurality of guide vanes 9 which are mounted on these end plates and which extend substantially radially but may also be curved in circumferential direction of the wheel 5. An intake conduit 12, which receives the contaminated air or other gas from a source (not shown) communicates with the axially directed intake opening 11 of the annular end plate 10.

As FIG. 1 shows, the wheel 5 is surrounded by a housing which is composed essentially by an end wall 13, a cylindrical wall 14 and an end wall 15 which latter belongs to an annular member 16. The end wall 15 has an outer portion, i.e. a radially outer portion which recedes in direction axially away from the impeller wheel 5 by some distance, a planar radially center portion which is spaced opposite the planar portion of the end plate 10, and an inner conical portion that is formed with an opening 16' which radially and concentrically surrounds the trumpet-shaped center portion of the end plate 10. The diameter of the opening 16' in the annular member 16 is substantially smaller than the diameter of the impeller wheel 5, for example approximately half as large, and is also substantially smaller than the diameter of the vortex chamber which will be described subsequently.

The drawing shows further that the cylindrical housing portion 14 is composed of two axially spaced circular sheet (e.g. sheet metal) rings 17 and 18 which are connected with the end walls 13 and 15, respectively, to form gas-tight connections with the same. There is provided a further circular sheet material ring 19 which bridges the space between the rings 17 and 18 and partially overlaps both of them, but is radially spaced from them. A further space, corresponding approximately to the spacing between the end plates 8 and 10, exists between the cylindrical housing portion 14 and the periphery of the impeller wheel 5. This latter space, therefore, is a radial space.

A cylindrical jacket 21 surrounds the annular member 16; the latter is axially shiftable within the confines of the jacket 21. The outer circumference 22 of the annular member 16 forms a gap with the jacket 21 and in this gap a circumferentially extending seal 23 is provided. A hydraulic cylinder and piston unit 24 connected via a link 25, a plurality of pivot arms 26, linkage rods 27 and axially guided thrust rods 28 of which a plurality of sets are provided spaced equi-angularly about the circumference of the arrangement, acts upon the annular member 16 and, depending upon the direction in which the double-acting piston in the unit 24 is displaced, serves to shift the annular member 16 axially within the jacket 21, i.e. to the left or to the right in FIG. 1.

The ring-shaped sheet material member 19 is surrounded by a ring-shaped tube 29 which is connected via a conduit 30 with a water supply line S. The tube 29 is provided in this embodiment with a plurality of radially inwardly directed nozzles 31 which extend through the member 19 so that they can spray washing liquid into the interior thereof. The unit composed of the elements 19, 29, 30 and 31 is axially shiftable to permit an optimum adjustment of the device.

The drawing shows further that at the axial end of the annular member 16 which faces away from the impeller wheel 5, i.e. at the left-hand side in FIG. 1, there is provided a substantially cylindrical compartment 32 the left-hand end of which is closed by an annular intermediate wall 33 having a circular opening 34 through which the intake conduit 12 extends concentrically but with radial spacing. The opening 34 interconnects the compartment 32 with the interior of a guide chamber 35 which in the conventional manner is of spiral configuration and which also surrounds the intake conduit 12 and is provided with an outlet 36. The jacket 21 is provided at the opposite axial sides of the annular member 16 with respective outlets 37 and 38 and a further outlet 39 is provided in the compartment 35.

In operation of the device illustrated in FIG. 1 the contaminated gas to be scrubbed is admitted in the direction indicated by the arrow through the intake conduit 12 to enter the interior of the impeller wheel 5. The latter rotates rapidly so that the contaminated gas is expelled at the periphery of the impeller wheel 5 in turbulent state and, due to the rotation of the impeller wheel 5, has a component of movement in direction circumferentially of the chamber bounded by the members 17–19. Immediately upon expulsion from the periphery of the rotating impeller wheel 5 the stream of gas is deflected, as indicated by the arrow 40, and in the region which in FIG. 1 is delimited by the end wall 15 of the member 16 and by the end wall 10 of the wheel 5, it forms a vortex. This region is the actual vortex chamber which is essentially disc-shaped, meaning that its axial extension is small in comparison to its radial extension.

The nozzles 31 spray washing liquid into this vortex chamber, preferably continuously. This washing liquid enters the vortex of contaminated gas and is subdivided into fine liquid particles due to the turbulence and movement of the gas. Depending upon the shape and size of these liquid particles some of them are flung outwardly as a result of centrifugal force, to run off through the gap between the member 19 and the members 17 and 18, respectively, to leave the device through the outlet 37. The major portion of the liquid particles, however, is taken along and carried in radially inward direction by the whirling gas stream due to the radial component of movement of the gas stream in the vortex chamber. This radial component may, incidentally, be influenced by axial displacement of the annular member 16, that is by changing the length of the vortex chamber. The optimum setting can readily be determined by simple experimentation and may be carried out manually or automatically.

Within this vortex chamber, and particularly in the zone which is delimited at opposite axial sides by the planar portions of the end plate 10 and of the end wall 15, the liquid particles travel circumferentially of the chamber one or more times and become enriched with adhering contaminants which they remove; i.e. scrub out of the gas stream. This zone, therefore, may be considered the scrubbing or washing zone; it also has the form of a flat annular disc, that is its axial dimension is small in comparison to its radial dimension.

Upon leaving the scrubbing zone the gas flows in the divergent space between the conical wall portion of the member 16 and the trumpet-shaped portion of the end plate 10 of the impeller wheel 5. In this space a reduction of the radial component in the flow speed of the gas stream results due to the divergence of the space, and this causes an agglomeration of the liquid particles which are enriched with contaminants.

The scrubbed gas travels through the opening 16' into the compartment 32 and traverses the same in a helical spinning motion. The compartment 32 serves as a contaminant separating zone wherein the liquid particles enriched with the scrubbed-out contaminants are flung by centrifugal force against the inner surface of the jacket 21, along which they run to the outlet 38.

The gas now travels through the opening 34 into the compartment 35 in which the gas stream which at this time still has a twisting flow is converted into a gas stream having a straight-line flow under pressure recovery. The gas stream then subsequently leaves the device through the outlet 36. Any liquid particles that may be present in the gas stream as it enters the compartment 35 are removed under the influence of centrifugal force and leave the device through the outlet 39.

Figure 2:
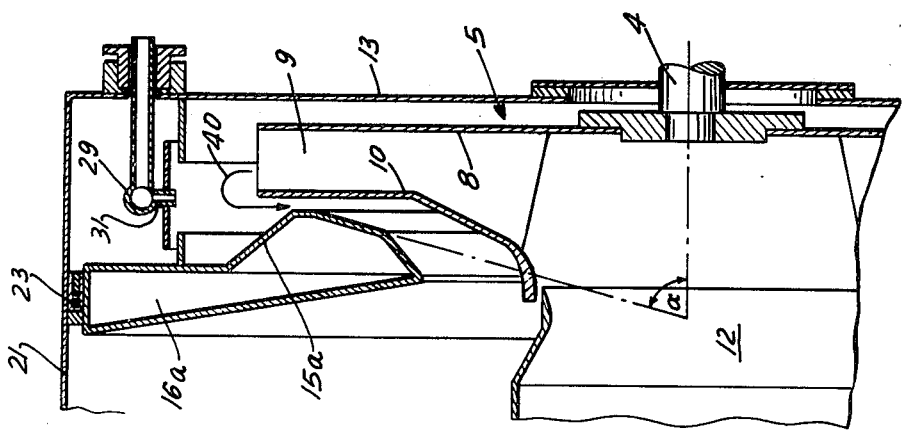
FIG. 2 is a fragmentary vertical section illustrating a detail of a further embodiment.

The embodiment in FIG. 2 corresponds substantially to that of FIG. 1 and therefore only those details are shown which are different from FIG. 1. In FIG. 2 the difference over the embodiment of FIG. 1 is that the end wall 15a of the annular member 16a, which faces towards the impeller wheel 5, is differently configurated. The annular portion of the wall 15a which is located substantially opposite the planar portion of the end plate 10 of the impeller wheel 5, is in FIG. 2 of slightly conical configuration, having a cone angle α of about 75°. In this embodiment, therefore, the axial dimension of the scrubbing zone increases in direction toward the axis of rotation of the impeller wheel 5. This means that by comparison to the embodiment of FIG. 1, in FIG. 2 the radial component of the speed of the gas stream is decreased in the regions close to the axis of rotation. It has been found that this embodiment improves the effectiveness of the device even further.

Figure 3:
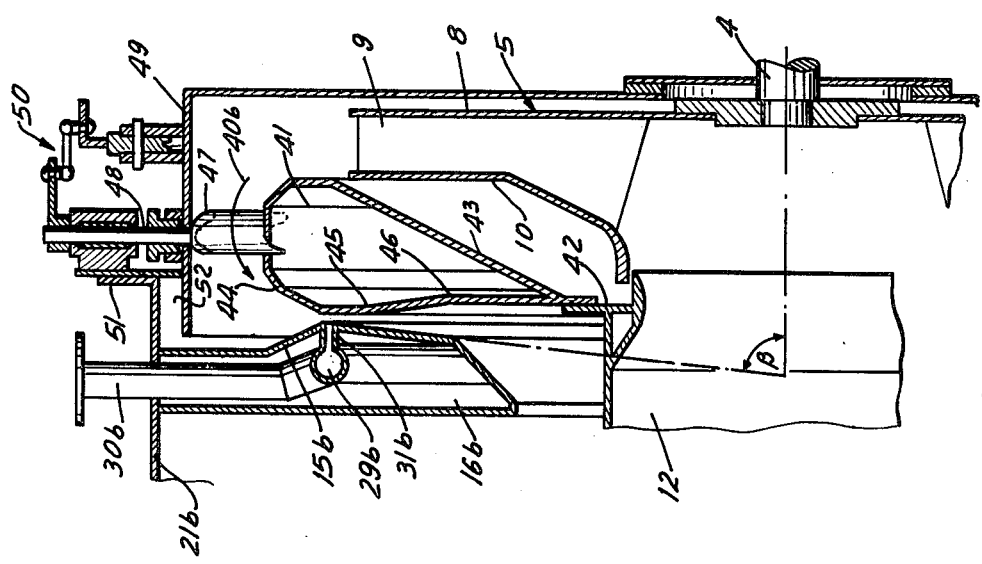
FIG. 3 is a view similar to FIG. 2, illustrating a detail of an additional embodiment.

The embodiment of FIG. 3 is also similar to that of FIG. 1, so that only the parts which are different have been illustrated. In FIG. 3, in contradistinction to the embodiments of FIGS. 1 and 2, a fixedly mounted annular guide baffle 41 is provided intermediate the annular member 16b and the impeller wheel 5. The guide baffle 41 has its inner circumferential edge fluid-tightly connected to a flange 42 of the intake conduit 12. The end face 43 facing the impeller wheel 5 is conically configurated and extends approximately to the circumference of the end plate 10 of the impeller wheel, with which it forms a narrow annular gap. In this region it merges into an aerodynamically configurated circumferential face 44 which is composed of several sheet material strips and which in section is approximately of semi-circular configuration. The side of the baffle 41 facing the annular member 16b is slightly conical in the outer radial region 45, the contour being mirror-symmetrical with respect to the oppositely located annular portion of the wall 15b, has its dimension increase in direction towards the axis of rotation. The cone angle $\beta$ is approximately 85°. A planar inner annular surface 46 merges with the conical portion 45.

Guide vanes 47 are mounted on the circumferential surface 44 at small but equi-angular distances. The guide vanes 47 are connected on shafts 48 which extend through the cylindrical jacket 49 so that the guide vanes 47 can be turned about a radial axis to different positions. A mechanism 50 is provided which permits the simultaneous turning or arresting of all of the guide vanes 47, and of course this is already known in the art. The guide vanes 47, and the possibility of adjusting them in the manner described, make it possible to vary the circumferentially directed component in the flow speed of the gas stream which flows around the surface 44 as indicated by the arrow 40b.

In this embodiment the axial position of the annular member 16b cannot be changed. The annular member 16b is fixedly connected with the jacket 21b which is secured to the jacket 49 via the flange 51. It overlaps the jacket 49 with radial spacing, so that a channel 52 is formed between them through which the centrifugally ejected washing liquid can flow out of the device.

In this embodiment the nozzles 31b through which the washing liquid is sprayed into the device extend axially of the device through the end wall 15b of the annular member 16b. Thus, the washing liquid is sprayed directly into the scrubbing zone. The annular tube 29b, which is again connected with a water supply line via a conduit 30b, is located within the annular member 16b.

Figure 4:
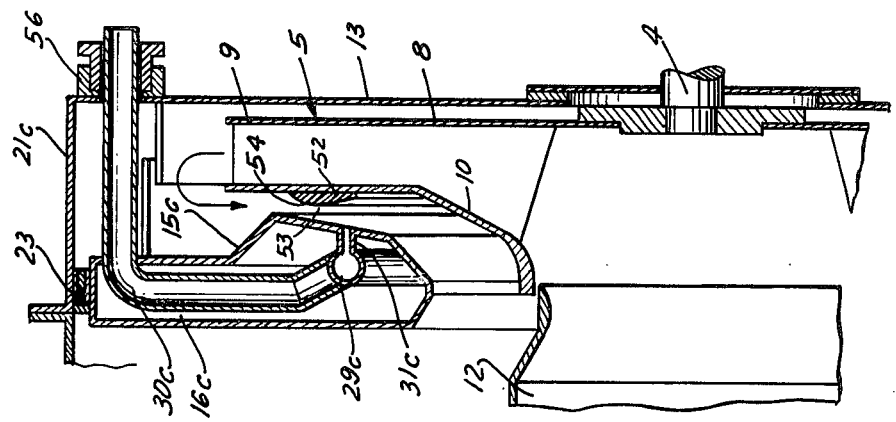
FIG. 4 is a view similar to FIG. 3, illustrating a detail of another embodiment.

FIG. 4 shows an embodiment wherein the nozzles 31c, which are mounted on the circular tube 29c, are arranged in the manner analogous to that shown in FIG. 3. However, they are not arranged at the radially outer edge region of the scrubbing zone, but instead approximately at the middle of the scrubbing zone. An atomizing ring 52 is mounted on the end plate 10 of the impeller wheel 5 and is provided with an inner portion 53 having a dimension which increases conically to a slight extent in outward direction and terminates in an annularly extending sharp edge 54. Analogously to the embodiments of FIGS. 1 and 2, the annular member 16c in FIG. 4 is axially displaceable. Because of this possibility, the conduit 30c is bent at right angles and extended outwardly through the end wall 13 through a sliding bushing 56.

Figure 5:
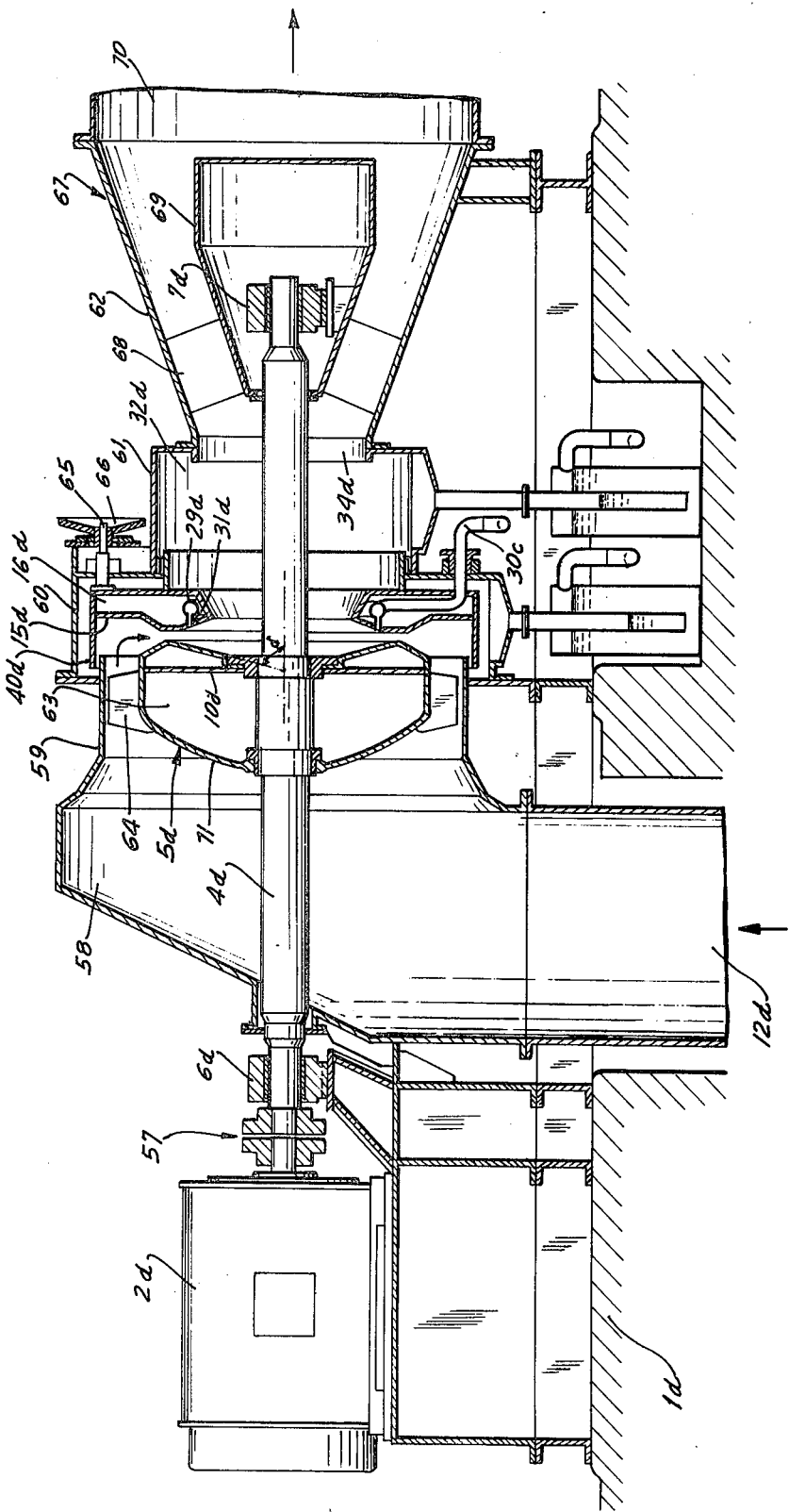
FIG. 5 is a side elevational view showing still a further embodiment of the invention.

Coming, finally, to the embodiment in FIG. 5 it will be appreciated that this differs more substantially from FIG. 1 than to FIGS. 2–4. In FIG. 5 the base 1d carries an electric motor 2d which drives the shaft 4d of an axial-flow impeller wheel 5d via a coupling 57. The shaft 4d is journalled in bearings 6d and 7d. The impeller wheel again receives the stream of contaminated gas through an intake conduit 12d which, however, extends from below into a suction chamber 58. From the suction chamber 58 there extends a jacket which coaxially surrounds the shaft 4d and is composed of rigidly connected substantially rotationally symmetrical elements 59, 60, 61 and 62.

In the drawing the element 59 converges from left to right in an essentially trumpet-shaped manner. Located within the element 59 for rotation therein with slight inward radial spacing is the axial impeller wheel 5d which has a closed hub 63 provided with a plurality of vanes 64 which are equi-angularly distributed over the circumference of the wheel 5d. At the gas inlet side the surface of the hub 63 is essentially calotte-shaped, as indicated at 71. At the opposite axial side the end plate 10d forms a chamber with the oppositely located mirror-symmetrical end wall 15d of the annular member 16d. The cross section of the chamber resembles the letter X, so that the chamber formed between these surfaces first tapers from the radially outer edge in inward direction, and then again diverges over the largest portion of its radial dimension. This inner divergent portion constitutes the scrubbing zone. The cone angle $\delta$ is approximately 75° in this embodiment.

As in FIG. 1, the annular member 16d of the embodiment in FIG. 5 can be shifted axially. However, instead of the cylinder and piston unit employed in FIG. 1, FIG. 5 utilizes threaded spindles 65 and hand wheels 66 by means of which the spindles can be turned. The circular tube 29d for the washing liquid is located in the interior of the annular member 16d and supplies washing liquid to the nozzle 31d.

The element 60 surrounds the annular member 16d, and axially adjacent to it is the element 61 which surrounds the compartment 32 which communicates via the narrow opening 34d with the compartment 67 which corresponds in purpose to the compartment 35 of FIG. 1, but acts as a diffusor due to the conical divergence of the element 62. Analogous to axial blowers the compartment 67 accommodates guide vanes 68 which are located between the element 62 and the diffusor hub 69.

In the embodiment of FIG. 5 the contaminated gas entering through the intake conduit 12d is deflected at a right angle in the chamber 58, and is then made to perform a helical twisting motion as it travels through and out of the axial flow impeller wheel 5d. In contradistinction to the preceding embodiments which use radial-flow impeller wheels and wherein the gas stream leaving the impeller wheel must be deflected through 180°, the embodiment of FIG. 5 requires for the gas stream leaving the impeller wheel 5d only a deflection of 90°, as indicated by the arrow 40d.

After passing the constriction between the walls 10d and 15d the gas stream enters the previously described scrubbing zone which diverges in direction towards the axis of rotation and wherein it comes in contact with the washing liquid that has been sprayed into this zone. The gas stream leaves the washing zone through the opening of the annular member 16d, enters the compartment 32d and from there the compartment 67 wherein the kinetic energy of the helical twisting motion of the gas stream is converted into static pressure by the vanes 68. The scrubbed gas leaves the device through the outlet conduit 70 as indicated by the arrow.

In all embodiments the radial-flow or axial-flow impeller wheel can be so constructed that the pressure at the outlet of the device is greater than at the inlet, so that this pressure differential can be used to overcome flow resistance which may exist in other parts of an apparatus with which the device of the present invention is being used, for example in a rotary drum or a refuse-burning installation. The embodiment of FIG. 4, utilizing the atomizing ring 52, produces a particularly intensive breaking-up of the sprayed-in liquid into small particles, so that the scrubbing effect is enhanced. The scrubbing effect is also enhanced by axially spraying the scrubbing liquid into the device, and directing it against the impeller wheel, but is further improved by the provision of the atomizing ring 52. The particular constructions of the invention, wherein the dimensions of the vortex chamber in axial direction can be varied, and the specific vortex chamber configuration in FIGS. 3-5, also further provide improvements. It has been found surprisingly that given a certain volumetric gas flow for a certain axial dimension of the vortex chamber the maximum scrubbing effect at constant washing liquid usage, or a minimum washing liquid usage at constant scrubbing effect can be obtained by resorting to these features.

It will be understood that each of the elements described above, or two or more together, may also find a useful application in other types of constructions differing from the types described above.

While the invention has been illustrated and described as embodied in a scrubber for contaminated gas, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A scrubber for contaminated gas, said scrubber comprising an inlet conduit having an outer end portion, an intermediate portion and an inner end portion; a housing surrounding the inlet conduit and having a first chamber at the inner end portion of said inlet conduit, a second chamber at the intermediate portion of said inlet conduit and a third chamber at the outer end portion of said inlet conduit; outlet means in said third chamber; a single impeller wheel communicating with the inner end portion of said conduit coaxially with the same and rotatably mounted in said first chamber; a wall defining with one transverse wall of the impeller wheel a passage having a radially outer end communicating with the first chamber and adjacent to the outer periphery of the impeller wheel and a radially inner end communicating with the second chamber; means for admitting contaminated gas through said inlet conduit to said wheel; means for spraying a washing liquid into the first chamber outwardly adjacent the outer periphery of the impeller wheel; means for displacing said wall axially relative to said one transverse wall of the impeller wheel so as to vary the axial dimension of said passage; and means for rotating said wheel about the axis thereof for displacing said contaminated gas centrifugally about said axis and towards said outer periphery of the impeller wheel, to be contacted by said washing liquid and for thereupon travelling through said passage into said second chamber where separation of the contaminants is effected so that the gas is scrubbed and then travels in clean condition to said third chamber to exit through said outlet means.

2. The scrubber defined in claim 1 wherein said first chamber has a dimension parallel to said axis which is much smaller than its dimension radial of said axis.

3. The scrubber defined in claim 2 wherein said impeller wheel is an axial-flow fan.

4. The scrubber defined in claim 2 wherein said wheel has an axial end face constituting one of said walls.

5. The scrubber defined in claim 4 wherein said means for spraying includes nozzles mounted in the other of said walls and directed axially toward said one wall, said one wall on said impeller wheel carrying an axially projecting atomizing ring projecting into said passage and generally in line with said nozzles.

6. The scrubber defined in claim 2, further comprising means at said outlet for separating said liquid from said gas.

7. The scrubber defined in claim 6 wherein the separating means includes a separation chamber centered on said axis and communicating with said passage through said outlet.

8. The scrubber defined in claim 2 wherein said means for admitting includes an inlet conduit opening at said wheel.

9. The scrubber defined in claim 8 wherein said inlet conduit extends axially through said second and third chambers and through said wheel.

10. The scrubber defined in claim 2 wherein said wheel lies axially to one side of said passage.

11. The scrubber defined in claim 10 wherein said wheel is a radial-flow impeller wheel.

12. The scrubber defined in claim 11 wherein said means for spraying includes a plurality of nozzles secured in one of said walls and directed into said passage.

13. The scrubber defined in claim 12 wherein said nozzles are directed axially toward said impeller wheel.

14. The scrubber defined in claim 2 wherein said chamber tapers radially at least partially, said walls being at least partially nonparallel.

* * * * *